3,634,275
PARTIALLY N-ALKYLATED DIPHENYLMETHANE BASES AS NEW CURING AGENTS FOR EPOXY RESINS

Norman K. Sundholm, Middlebury, Conn., assignor to Uniroyal, Inc., New York, N.Y.
No Drawing. Filed July 25, 1968, Ser. No. 747,454
Int. Cl. C07c 87/54; C08f 45/72
U.S. Cl. 252—182                                2 Claims

---

ABSTRACT OF THE DISCLOSURE

Partially N-alkylated diphenylmethane bases are improved curing agents for epoxy resins because they are liquids at room temperature, or low-melting solids.

---

The present invention relates to the curing of epoxy resins, and more particularly to a new class of curing agents for epoxy resins.

Uncured epoxy resins have no useful structural properties. Curing, or hardening, causes such resins to become tough, hard and infusible, thus having resistance to structural distortion at elevated temperatures.

Epoxy resins, which may be polymeric or monomeric, are mixtures of molecules containing the epoxy group represented as

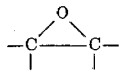

The epoxy group serves as a point for chain extension and crosslinking and is present in epoxy resins on the average of more than one per molecule. The concentration of epoxy groups is generally described by the term "epoxide equivalent" which is the number of grams of resin containing one gram equivalent of epoxide.

Description of the synthesis, curing and application of epoxy resins is presented in the text "Handbook of Epoxy Resins" by H. Lee and K. Neville, McGraw-Hill, Inc. 1967.

Most of the commercial epoxy resins are the polyglycidyl ethers formed by the reaction of epichlorohydrin with a polyhydric phenol or polyalcohol in the presence of a basic compound such as sodium hydroxide, which catalyzes the reaction to produce the chlorohydrin intermediate, acts as the dehydrohalogenating agent, and neutralizes the hydrochloric acid formed. The polyhydric phenol used to the greatest extent is 2,2-bis(4-hydroxyphenyl) propane, commonly known as bisphenol A. However, other epoxy resins may be polyepoxides formed by the epoxidation of a polyene, such as dicyclopentadiene and 4-vinylcyclohexene, a homopolymerized diene, such as polybutadiene, or a glyceride of an unsaturated fatty acid, such as soybean oil.

There are two methods for curing epoxy resins. In catalytic curing, the epoxy molecules react directly with each other in a reaction started by a catalyst; such systems are said to be homopolymerized. On the other hand, heteropolymerization occurs when hardeners or curing agents containing reactive groups which unite with the epoxy groups are mixed into the resins. These curing agents become a vital part of the cured product.

A variety of chemical compounds may act as curing agents for epoxy resins. One class of suitable compounds is the organic amines and various derivatives thereof, while a second is the organic dibasic and polybasic acids and acid anhydrides.

Examples of the amine class are 4,4'-methylenedianiline, meta-phenylenediamine, 4,4'-diaminodiphenyl sulfone, diethylenetriamine, diethylaminopropylamine, piperidine, triethylamine, benzyldimethylamine, 2,4,6-tris (dimethylaminomethyl)-phenol and its tri-2-ethylhexaote salt, dicyandiamide, boron trifluoride-monoethylamine complex and triethanolamine borate.

Examples of the acid and anhydride class are oxalic acid, phthalic anhydride, hexahydrophthalic anhydride, dodecenyl succinic anhydride and pyromellitic dianhydride.

Many of the above mentioned compounds are solids. In commercial practice, the curing agent is usually and desirably mixed as a liquid with the liquid epoxy resin. Therefore, heating may be necessary to transform the curing agent into a liquid if it is a solid. Thus it is advantageous to the normal blending operation involved in curing epoxy resins if the curing agent is a liquid or low-melting solid.

It has now been discovered that the processing characteristics of a widely used class of epoxy resin curing agents, the diphenylmethane bases, can be improved upon. These curing agents have previously been available only as solids unless used as a solution in a suitable solvent or in admixture with another curing agent. The discovery is that the partial N-alkylation of the diphenylmethane bases, which affords a mixture of unalkylated and N-alkylated diphenylmethane bases, produces compositions having lower melting points and correspondingly lower solidification points. Thus, it is an object of the instant invention to provide diphenylmethane base curing agents which are liquids at room temperature, or which are low-melting solids.

Diphenylmethane bases are the well-known poly primary amines formed by the acid-catalyzed condensation of aniline and formaldehyde, or formaldehyde-generating substance.

The foremost example of a diphenylmethane base is 4,4'-methylenedianiline which has found extensive use as an epoxy resin curing agent. Other examples are 2,2'-methylenedianiline, 2,4'-methylenedianiline and tri-, tetra-, penta-, and hexa-functional diphenylmethane bases. The higher functional diphenylmethane bases are compounds having three or more benzene nuclei joined to each other by a methylene group, with each benzene ring substituted by one NH₂ group.

One particularly useful diphenylmethane base epoxy resin curing agent is sold under the trademark TONOX, a composition produced by Uniroyal, Inc. TONOX generally is comprised approximately of: 56% 4,4'-methylenedianiline; 14% 2,4'-methylenedianiline; 2% 2,2'-methylenedianiline; and 28% of the higher functional diphenylmethane bases.

An effective lowering of the melting and solidification points of the diphenylmethane base curing agents is accomplished when more than 4% of the primary amino groups of the diphenylmethane bases or mixtures of diphenylmethane bases are alkylated to form secondary amino groups. As the percentage of alkylation is increased, the lowering of the melting and solidification points is achieved to a greater degree. However, as the amount of alkylation is increased the effectiveness of the polyamine mixture as a curing agent decreases as demonstrated by the lowering of the heat-distortion temperature. The heat-distortion temperature indicates that temperature at which the cured resin will yield under a specified load. When about 50% of the amino groups are monoalkylated, the heat-distortion temperature is lowered to an undesirable extent.

The alkyl groups substituted on the amino groups of the diphenylmethane bases may be either primary or secondary, and contain 1 to 8 carbon atoms. Examples of those alkyl groups which effectively lower the melting and solidification points of the diphenylmethane base epoxy resin curing agents, but do not lower the heat-distortion temperature an undesirable degree are methyl, ethyl, n-propyl, isopropyl, n-butyl, sec-butyl, isoamyl, 1,3-dimethylbutyl, 1,4-dimethyl-pentyl and 2-octyl.

Two methods may be used to prepare the partially N-alkylated diphenylmethane bases which serve as low melting point and liquid curing agents.

One method of achieving the partial N-alkylation of a diphenylmethane base is to react the base with a deficiency of a suitable alkylating agent. The reaction is effected by using a carbonyl compound in the presence of hydrogen and a suitable hydrogenation catalyst, or by using an alcohol with a suitable catalyst, or by using an alkyl halide, sulfate or sulfonate in the presence of a base. Mixtures of these reagents may also be used so that more than one substituent group is introduced into the final composition.

Another method of producing the partially N-alkylated composition is to react a mixture of aniline and an N-alkylaniline with formaldehyde or a formaldehyde-generating substance in the presence of an acid. Unreacted amines are removed by vacuum or steam distillation. The amount of formaldehyde used should be such that the molar ratio of the total amines (i.e. aniline plus N-alkylaniline) to the formaldehyde is at least about 2:1 or higher. The mixture of amines may be pre-reacted with formaldehyde. In this method, aniline with a mixture of N-alkylanilines may also be used so that more than one substituent group is present in the final composition. The molar ratio of N-alkylaniline to aniline may be in the range 1:2 to 1:39, with the preferred range being 1:9 to 1:39. Reaction temperatures may be in the range 90–160° C., with the preferred range being 110–140° C. The following examples serve to further illustrate the methods of preparation and the effectiveness of the partially N-alkylated diphenylmethane base curing agents of the instant invention.

EXAMPLE I

Reductive alkylation of TONOX with 0.25 molar proportion of acetone

Into a 600-ml. Magne-Dash autoclave were charged 210 grams (1.0 mole) of TONOX, 14.5 grams (0.25 mole) of acetone, 75 ml. of methanol and 3.0 grams of platinum sulfide on carbon catalyst. The contents, while agitated, were subjected to 485–900 p.s.i.g. of hydrogen at 95° C. for 1¾ hours. There was very little pressure drop during the last ¾ hour. The hydrogenated charge was removed from the autoclave, filtered through a filter aid and the solvent evaporated under reduced pressure on a steam bath to produce 213 grams of brown oil. This oil showed no signs of solidifying on prolonged standing, but became a paste, completely remelting at 50° C., when extensively agitated by scratching. Its infrared spectrum shows the characteristic bands of the isopropyl group at 1365 and 1385 cm.$^{-1}$. About 12.5% of the primary amino groups were alkylated to isopropylamino groups.

EXAMPLE II

Reductive alkylation of TONOX with 0.50 molar proportion of formaldehyde

A charge of 210 grams (1.0 mole) of TONOX, 15.0 grams (0.50 mole) of paraformaldehyde, 370 ml. of methanol and 6.0 grams of 5% palladium on carbon catalyst in a 1.7-liter rocking autoclave was hydrogenated at 560–670 p.s.i.g. of hydrogen at 75–90° C. for 5 hours. Workup similar to that of Example I gave 214 grams of brown oil. This oil showed no signs of solidifying on prolonged standing, but became a paste, completely remelting at 50° C., when seeded with 4,4'-methylenedianiline and scratched. Its infrared spectrum shows the characteristic band of a methyl group substituted on an aromatic amino group at 2820 cm.$^{-1}$. About 25% of the primary amino groups were alkylated to methylamino groups.

EXAMPLE III

Reductive alkylation of 4,4'-methylenedianiline with 0.25 molar proportion of formaldehyde A charge of 198 grams (1.0 mole) of 4,4'-methylenedianiline, 7.5 grams (0.25 mole) of paraformaldehyde, 400 ml. of methanol and 6.0 grams of 5% palladium on carbon in a 1.7-liter rocking autoclave was hydrogenated at 560–600 p.s.i.g. of hydrogen at 50° C. for 3 hours. Workup gave 199 grams of brown oil, which crystallized rapidly on cooling. On melting, it clears at 77° C. About 12.5% of the primary amino groups were alkylated to methylamino groups.

EXAMPLE IV

Reductive alkylation of 4,4'-methylenedianiline with 0.25 molar proportion of methyl isobutyl ketone A charge of 99 grams (0.50 mole) of 4,4'-methylenedianiline, 12.5 grams (0.125 mole) of methyl isobutyl ketone, 195 ml. of methanol and 3.0 grams of 5% platinum sulfide on carbon in a 600-ml. Magne-Dash autoclave was hydrogenated at 800–950 p.s.i.g. of hydrogen at 150° C. for 1 hour. Workup gave 107 grams of brown oil, which crystallized quite rapidly on cooling. On melting, it clears at 76° C. About 12.5% of the primary amino groups were alkylated to 1,3-dimethylbutylamino groups.

Other products were prepared by this reductive alkylation method; some data on them are given in Table I.

TABLE I.—PROPERTIES OF PRODUCTS OF REDUCTIVE ALKYLATION OF DIPHENYLMETHANE BASES

| Reactants | Molar proportion | M.P.,[a] °C. | HDT, °F.[b] in Epon 828 |
|---|---|---|---|
| TONOX with carbonyl compound: | | | |
| Formaldehyde | 0.25 | 59 | 310 |
| Do | 0.50 | 50 | 293 |
| Acetone | 0.10 | 67 | 320 |
| Do | 0.25 | 50 | 306 |
| Do | 0.50 | Oil | 276 |
| Butyraldehyde | 0.25 | 49 | 301 |
| Methyl isobutyl ketone | 0.125 | 60 | 316 |
| 2-octanone | 0.25 | 62 | 285 |
| 4,4'-methylenedianiline with— | | | |
| Formaldehyde | 0.25 | 77 | 303 |
| Do | 0.50 | 65 | 280 |
| Do | 1.00 | Oil | 228 |
| Acetone | 0.25 | 81 | 290 |
| Do | 0.50 | 75 | 268 |
| Do | 1.00 | Oil | 235 |
| Methyl ethyl ketone | 0.25 | 78 | 295 |
| Methyl isobutyl ketone | 0.25 | 76 | 302 |

[a] These products have broad melting ranges. The given M.P. is the point at which the melt clears.
[b] Heat-distortion temperature.

Two procedures were used in the preparation of the curing agents of this invention by reaction of a mixture of an N-alkylaniline and aniline with formaldehyde. In the first procedure, described in Example V, the mixture of amines is reacted with aqueous formaldehyde, and the product is heated with a small amount of acid. In the second procedure, described in Example VI, paraformaldehyde is added to the heated mixture of amines containing a small amount of aniline hydrochloride, and heating is continued.

EXAMPLE V

Condensation of a mixture of N-isopropylaniline and aniline (1:9 molar ratio) with formaldehyde A stirred mixture of 167.4 grams (1.80 moles) of aniline, 27.0 grams (0.20 mole) of N-isopropylaniline and 46.9 grams (0.58 mole) of 37% formaldehyde was heated at 65° C. for 3 hours. To the organic layer, separated from the water layer, was added 7 ml. of concentrated hydrochloric acid. This solution was stirred and heated, distilling an amine-water mixture until the temperature of the solution reached 110° C. The amine layer was returned to the solution, which was stirred for 6 hours at 110° C. A solution of 5.6 grams of sodium hydroxide in 100 ml. of water was added. After stirring, the organic layer was separated, washed with hot water and subjected to steam distillation to remove the excess monoamines. The residue was separated from the water layer and dried under reduced pressure on a steam bath to give 109 grams of brown oil. This product remained an oil, even after extensive agitation by scratching or after seeding with 4,4'-methylenedianiline. By infrared analysis it was determined that about 16% of the amino groups of the mixture were in the form of isopropylamino groups.

EXAMPLE VI

Condensation of a mixture of N-isopropylaniline and aniline (1:19 molar ratio) with paraformaldehyde Paraformaldehyde (17.4 grams, 0.58 mole) was added in portions during one-half hour to a stirred mixture of 169.3 grams (1.82 moles) of aniline, 10.4 grams (0.08 mole) of aniline hydrochloride and 13.5 grams (0.10 mole) of N-isopropylaniline in a flask equipped with a Dean-Stark distilling receiver filled with toluene. The addition temperature was 125° C. Water formed from the reaction collected as a lower layer in the receiver. The reaction mixture was stirred at 125° C. for 4 hours and then cooled to 80° C. A solution of 5.6 grams of sodium hydroxide in 150 ml. of water was added and the mixture stirred for several minutes. The organic layer was separated and subjected to steam distillation to remove the excess monoamines. The residue was separated from the water layer, washed with water and dried under reduced pressure on a steam bath to give 100 grams of brown oil. The product remained an oil, even after extensive agitation by scratching or after seeding with 4,4'-methylenedianiline. Of this product 66% distilled at 156–180° C. (0.3 mm.). On this basis 66% of the product consisted of diamines and 34% of the higher functional polyamines. By infrared analysis it was determined that 8% of the amino groups of the mixture were in the form of isopropylamino groups.

Other products were prepared by these procedures; some data on them are given in Table II and below.

TABLE II.—PROPERTIES OF PRODUCTS OF CONDENSATION OF MIXTURES OF N-ISOPROPYLANILINE AND ANILINE WITH FORMALDEHYDE

|  | Reaction temp., ° C. | M.P.,[2] ° C. | HDT, ° F.[3] In Epon 828 | HDT, ° F.[3] In D.E.N. 431 |
| --- | --- | --- | --- | --- |
| Procedure of Example V:[1] | | | | |
| 0.20:1.80:0.58 | 110 | Oil | 289 | 211 |
| 0.15:1.85:0.58 | 110 | 40 | 304 | 284 |
| 0.10:1.90:0.58 | 110 | 52 | 315 | 317 |
| Procedure of Example VI:[4] | | | | |
| 0.67:1.33:0.58 | 125 | Oil | 242 | |
| 0.40:1.60:0.58 | 125 | Oil | 277 | |
| 0.15:1.85:0.58 | 125 | Oil | 304 | |
| 0.10:1.90:0.58 | 125 | Oil | 304 | 276 |
| 0.10:1.90:0.58 | 110 | 37 | 308 | 275 |
| 0.13:2.37:0.50 | 130 | 42 | 298 | 303 |
| 0.05:1.95:0.50 | 130 | 45 | 308 | |

[1] Molar ratio of N-isopropylaniline:Aniline:Formaldehyde.
[2] These products have broad melting ranges. The given M.P. is the point at which the melt clears.
[3] Heat-distortion temperature.
[4] Molar ratio of N-isopropylaniline:Aniline:Paraformaldehyde.

EXAMPLE VII

Preparation of N-alkyl-4,4'-methylenedianilines

Three of these derivatives were prepared by the general procedure given for N-isopropyl-4,4'-methylenedianiline: One mole of 4,4'-methylenedianiline was reductively alkylated with one mole of acetone using the procedure of Example I. The product was an oil which was shown by gas-liquid and thin-layer chromatography to be a mixture of unreacted 4,4'-methylenedianiline, the known 4,4'-methylenebis(N-isopropylaniline) and a new compound which in both analytical techniques appeared between the two known compounds. The three compounds were separated by column chromatography using alumina as adsorbent and chloroform as eluent. Twenty grams of the product was separated into 35 fractions by this technique. The last 11 fractions were solid and were identified as unreacted 4,4'-methylenedianiline by melting point. All other fractions were liquid. The first 3 fractions had infrared spectra identical to that of 4,4'-methylenebis(N-isopropylaniline). The fifth through the fourteenth fractions had identical infrared spectra consistent with a 4,4'-methylenedianiline in which one of the amino groups is monosubstituted. These fractions were collected, combined with those from a repeat run and vacuum distilled to give 9.5 grams of colorless oil, B.P. 156–158° C. (0.2 mm.).

*Analysis.*—Calculated for $C_{16}H_{20}N_2$ (percent): C, 80.00; H, 8.33; N, 11.67. Found (percent): C, 80.25; H, 8.73; N, 11.48.

N-methyl - 4,4' - methylenedianiline was obtained as a colorless crystalline solid (recrystallized from 1:1 n-hexane-benzene) melting at 62° C.

*Analysis.*—Calculated for $C_{14}H_{16}N_2$ (percent): C, 79.25; H, 7.55; N, 13.21. Found (percent): C, 78.97; H, 7.69; N, 13.26.

N - (2 - octyl) - 4,4' - methylenedianiline was obtained as a colorless oil boiling at 214–216° C. (0.5 mm.).

*Analysis.*—Calculated for $C_{21}H_{30}N_2$ (percent): C, 81.29; H, 9.68; N, 9.03. Found (percent): C, 81.34; H, 9.81; N, 8.96.

EXAMPLE VIII

In this example, representative partially N-alkylated diphenylmethane bases were tested for effectiveness as curing agents for a typical commercial epoxy resin. The resin used was Epon 828 (manufactured by Shell Chemical Company), which is produced from epichlorohydrin and bisphenol A, and has an epoxide equivalent of 188 and an approximate average molecular weight of 380.

The equivalent weights of the curing agents of the instant invention, the weights in grams that react stoichiometrically with 188 grams of Epon 828, were determined; one amino hydrogen atom reacts with one epoxy group. An increase in the equivalent weights over those of the diphenylmethane bases is due to replacement of a fraction of the hydrogen atoms on the amino groups by the alkyl groups, and by the increase in the average molecular weight thereby caused. Knowing the amount and kind of N-alkylation, the equivalent weights were readily calculated. In the case of the products of reductive alkylation, these were known from the amount and identity of the carbonyl compound used. For the products of the condensation of formaldehyde with the mixtures of N-isopropylaniline and aniline, the amount of isopropylamino group present was determined by infrared analysis. The absorbance of the 1385 cm.$^{-1}$ band of the isopropyl group of the products was compared with that of synthetic mixtures of 4,4'-methylenedianiline and N-isopropyl-4,4'-methylenedianiline.

By this infrared analysis method, the product made using a 1:2 molar ratio of N-isopropylaniline to aniline has about 48% of the amino groups in the form of isopropylamino groups; with 1:4 molar ratio, 33%; with a 1:9 molar ratio, 16%; with a 1:19 molar ratio, 8%; and with a 1:39 molar ratio, 4%.

As an example, 4,4'-methylenedianiline has a molecular weight of 198 and an equivalent weight of 49.5. The product prepared by reductively alkylating it with 0.25 molar proportion of acetone has an equivalent weight of 55.6, as a result of the increase of the average molecular weight to 208.5 and a decrease in the number of active hydrogen atoms per average molecular from 4 to 3.75.

Calculations were made for the amount of curing agent required to react with 100 grams of Epon 828. In the instance where the 4,4'-methylenedianiline was reductively alkylated with 0.25 molar proportion of acetone, 29.6 grams was used. The weighed quantity of curing agent was heated to 80° C. or to its melting point if it is higher, and was blended with 100 grams of the resin heated to 0° C. The blend was centrifuged to deaerate it and poured into a mold having inside dimensions of 7 x ½ x ½ inches. Curing was effected by heating the molds at 80° C. for 2 hours followed by 3 hours at 150° C. The cured bars were removed and tested for heat-distortion temperature (HDT) using the procedure of ASTM D648–56; the data are given in Tables I and II and below.

Some of the compositions were also tested in D.E.N. 431 (manufactured by The Dow Chemical Co.) an epoxy Novolac resin having an epoxide equivalent of 175. The product of reductive alkylation of TONOX with 0.25 molar proportion of acetone has an HDT of 300° F. in this resin. The remaining data are given in Table II.

The data show that although the products were tested at equal NH amounts the higher the extent of substitution the lower the heat-distortion temperature. This is due to the lower heat-distortion temperatures produced by the N-alkylated compounds over that of the parent diphenylmethane base: 321° F. for TONOX and 305° F. for 4,4'-methylenedianiline in Epon 828. In this resin the HDT produced by N-methyl-4,4'-methylenedianiline is 243° F.; that of the monoisopropyl compound is 225° F. From Table I, when the molar proportion of formaldehyde and acetone to 4,4'-methylenedianiline is 1.00 (or 50% monoalkylated amino groups) the HDT values are only 228° F. and 235° F., respectively. Thus it is most desirable to keep the percentage of N-monoalkylation below 50%.

The product formed from N-sec-butylaniline, aniline and formaldehyde in the molar ratio 0.10:1.90:0.58 using the procedure described in Example V gives a heat-distortion temperature of 302° F. when tested as a curing agent for Epon 828. A bottled sample of this product did not solidify on prolonged standing, but a sample intermittently scratched for 5 days became a paste which cleared at 53° C. on melting. The product from N-isopropylaniline, N-sec-butylaniline, aniline and paraformaldehyde in the molar ratio 0.05:0.05:1.90:0.58 using the procedure described in Example VI at 125° C. gives a heat-distortion temperature of 311° F.; it remains liquid even after seeding with 4,4'-methylenedianiline and scratching over a prolonged period.

The data in the tables show that the N-alkylation of the diphenylmethane bases results in a lowering of the melting point (the point at which the melt clears). The products of reductive alkylation of TONOX all melt lower than TONOX. TONOX has a variable and broad melting range; the sample from which these products were prepared cleared at 69° C. when melted. Also all of the products from 4,4'-methylenedianiline have melting points lower than that of the technical material used, 86–90° C. All of the products from TONOX cool to room temperature as liquids and if they do eventually solidify it requires a longer time than TONOX for them to do so. The products from 4,4'-methylenedianiline supercool to a greater extent than the sample of the di-primary amine used. For example, the product of reductive alkylation with 0.10 mole of formaldehyde supercools to 51° C., while the di-primary amine supercools to 81° C.

To a large degree it is due to the formation of the N-alkyl-4,4'-methylenedianilines and 4,4'-methylenebis N-alkylanilines), which are liquids or solids of low melting point, that these partially N-alkylated diphenylmethane bases are liquid or have lowered melting points. However, other compounds may be present. Analysis of the products of Examples I and VI by gas-liquid chromatography showed the presence of the following compounds: 4,4'-methylenedianiline, N-isopropyl-4,4'-methylenedianiline, 4,4'-methylenebis(N-isopropylaniline), 2,2'-methylenedianiline, 2,4'-methylenedianiline, and a compound believed to be 2-amino-4'-isopropylaminodiphenylmethane. The higher functional diphenylmethane bases are not volatile under the conditions of the analysis.

A synthetic mixture of equimolar amounts of 4,4'-methylenedianiline, N-isopropyl-4,4'-methylenedianiline, and 4,4'-methylenebis(N-isopropylaniline), heated to effect solution, remained a clear liquid for 5 days at room temperature before partial crystallization of the 4,4'-methylenedianiline began. If the diisopropyl compound was absent, the partial crystallization began after 3 hours.

It is to be understood that in the use of these new curing agents various other compounding ingredients may be used with the epoxy resin. These include other curing agents, diluents, fillers, resinous modifiers, plasticizers and flexibilizers. The curing temperature is in the range 60–200° C., and the curing time 1–24 hours.

Having thus described my invention, what I claim and desire to protect by Letters Patent is:

1. The products of an acid catalyzed condensation reaction of an N-alkylaniline, aniline and formaldehyde wherein:
   (a) the alkyl group in said N-alkylaniline is primary or secondary and contains 1 to 8 carbon atoms;
   (b) the molar ratio of N-alkylaniline to aniline is in the range of 1:2 to 1:39 and the molar ratio of the sum of said two amines to said formaldehyde is at least 2:1; and
   (c) said condensation reaction occurs at a temperature between about 90 and 160° C. in the presence of an acid wherein the partially N-alkylated products have 4–50% of the amino groups monoalkylated.

2. The reaction products of diphenylmethane bases consisting essentially of 2,2'-methylenedianiline, 2,4'-methylenedianiline, 4,4'-methylenedianiline, and such higher functional diphenylmethane bases which possess three or more benzene nuclei joined to each other by a methylene group, each said benzene ring being substituted with one amino group; with an aldehyde or ketone and hydrogen wherein:
   (a) the basic group in said diphenylmethane bases is a primary amino group;
   (b) the aldehyde or ketone contains 1 to 8 carbon atoms;
   (c) the molar ratio of aldehyde or ketone to amino groups in said diphenylmethane bases is in the range of 1:25 to 1:2 thereby resulting in between 4 and 50% of the amino groups on said diphenylmethane bases in said reaction product being monoalkylated; and
   (d) said reaction occurs at a temperature of between about 25 and 250° C., with said diphenylmethane bases and aldehyde or ketone reactants contacting a hydrogenation catalyst in the presence of said hydrogen.

References Cited
UNITED STATES PATENTS

| | | | |
|---|---|---|---|
| 2,818,433 | 12/1957 | Erickson | 260—520 |
| 2,974,168 | 3/1961 | Sharp et al. | 260—520 |
| 3,253,031 | 5/1966 | Powers | 260—520 |
| 3,260,751 | 7/1966 | Powers et al. | 260—520 |
| 3,277,173 | 10/1966 | Powers et al. | 260—520 |

LEON D. ROSDOL, Primary Examiner

I. GLUCK, Assistant Examiner

U.S. Cl. X.R.

252—401; 260—47 EN, 570 D